United States Patent [19]

Tick et al.

[11] 4,323,654

[45] Apr. 6, 1982

[54] MOLDABLE GLASS COMPOSITIONS

[75] Inventors: Paul A. Tick, Corning; Leon M. Sanford, deceased, late of Campbell, N.Y., by Michele R. Sanford, administratrix

[73] Assignee: Corning Glass Works, Corning, N.Y.

[21] Appl. No.: 248,001

[22] Filed: Mar. 26, 1981

[51] Int. Cl.³ .......................... C03C 3/14; C03C 3/16
[52] U.S. Cl. ................................................ 501/47
[58] Field of Search ........................................ 501/47

[56]  References Cited

U.S. PATENT DOCUMENTS

| 2,291,958 | 8/1942 | Garrison | 501/47 |
| 2,390,191 | 12/1945 | Stanworth | 501/47 |
| 3,926,649 | 12/1975 | Ray et al. | 501/47 |
| 3,989,532 | 11/1976 | Ray et al. | 501/47 |
| 4,108,673 | 8/1978 | Toratani et al. | 501/46 |
| 4,115,131 | 9/1978 | Ishibashi | 501/47 |
| 4,165,989 | 8/1979 | Asahara | 501/47 |
| 4,206,016 | 6/1980 | Booth | 501/47 |
| 4,285,730 | 8/1981 | Sanford et al. | 501/44 |

Primary Examiner—O. R. Vertiz
Assistant Examiner—Mark Bell
Attorney, Agent, or Firm—Kees van der Sterre

[57] ABSTRACT

Alkali-$Ta_2O_5$-$B_2O_3$-$P_2O_5$ glass compositions suitable for providing molded optical elements or the like, exhibiting glass transition temperatures below 500° C., refractive index values ($n_d$) above 1.523, and acceptable water durability are disclosed.

3 Claims, 1 Drawing Figure

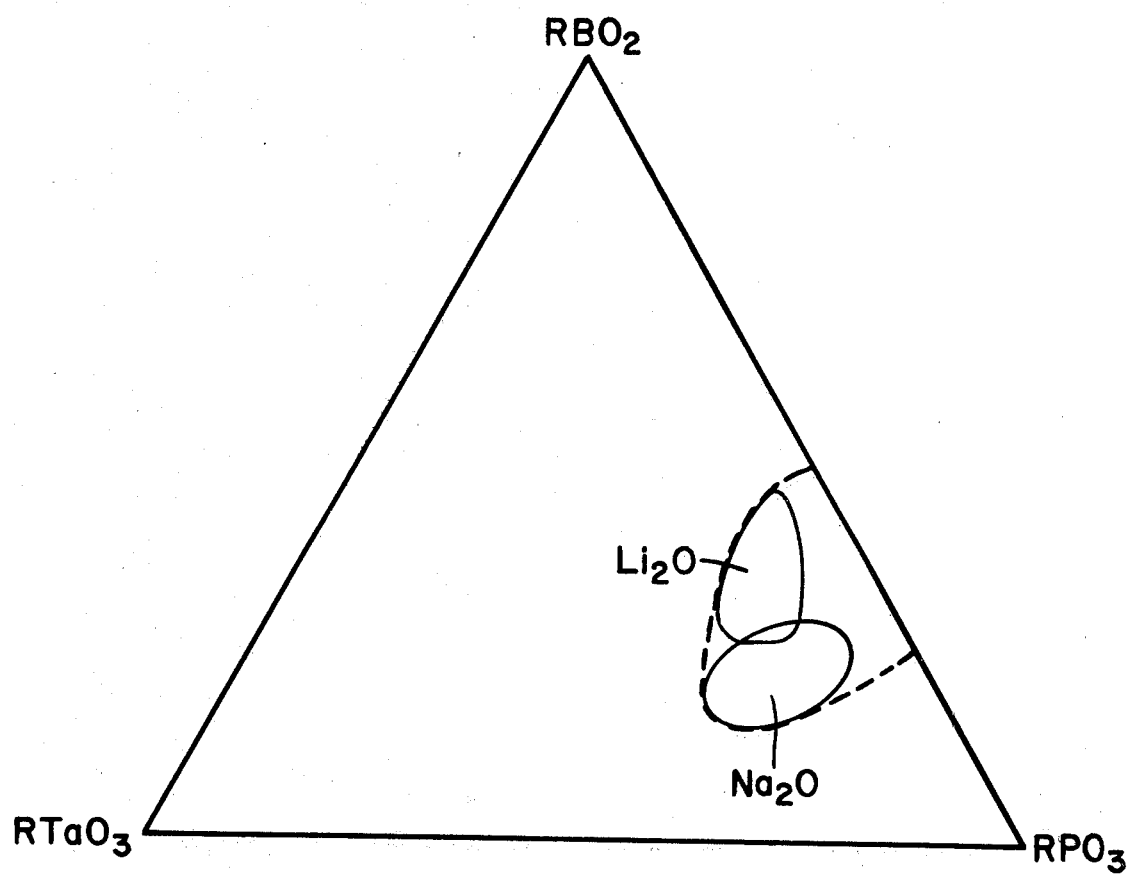

MOLDABLE GLASS COMPOSITIONS

The present invention relates generally to glass compositions for optical applications which can be formed at low temperatures, and particularly to a new family of alkali-$Ta_2O_5$-$B_2O_3$-$P_2O_5$ glasses for molded optics having high refractive index values in combination with low glass transition temperatures and acceptable moisture resistance.

Glasses based on the use of $P_2O_5$ rather than $SiO_2$ as a primary network former are old, but as originally developed were notable primarily for their susceptibility to attack by moisture. U.S. Pat. No. 2,291,958 discloses water soluble alkali-$B_2O_3$-$P_2O_5$ glasses useful for controlling the viscosity of aqueous suspensions.

Alkali borophosphate sealing glasses comprising $Al_2O_3$ and one or more of MgO, BaO or ZnO ae disclosed in U.S. Pat. No. 2,390,191, those glasses exhibiting better durability than the pure ternary compositions. U.S. Pat. No. 3,926,649 discloses similar alkali borophosphate glasses, comprising MgO, CaO and/or BaO as modifiers and containing only minor amounts of $Al_2O_3$, exhibiting glass transition temperatures below 225° C. but with water solubilities as high as 5.5% per minute at 100° C.

The use of $Nb_2O_5$ as a modifier in high dispersion borophosphate optical glasses is disclosed in U.S. Pat. No. 4,115,131. Those glasses may include, as optional constituents, one or more alkali metal oxides, alkaline earth metal oxides, $Ta_2O_5$, $Y_2O_3$, $As_2O_5$, F, $ZrO_2$, $Al_2O_3$, $TiO_2$, $GeO_2$ or $WO_3$.

Other patents disclosing phosphate optical glasses incorporating alkali and alkaline earth metal oxide modifiers, with $B_2O_3$ as an optional constituent, are U.S. Pat. Nos. 3,989,532 and 4,108,673. A Faraday rotation glass comprising $Tb_2O_3$ in an alkali-alkaline earth-borophosphate base is disclosed in U.S. Pat. No. 4,165,989, while U.S. Pat. No. 4,206,016 suggests the use of certain sodium borophosphate glasses containing $ZrO_2$, MgO and/or $Al_2O_3$ as ionic conductors in molten sodium.

SUMMARY OF THE INVENTION

The present invention comprises a family of alkali borophosphate glass compositions comprising $Ta_2O_5$ as the essential modifying constituent, such compositions providing glasses for molded optics exhibiting low transition temperatures, high refractive indices and in some cases chemical durability superior to that of many known glasses with low softening points.

Broadly defined, the glasses of the invention have compositions consisting essentially, in mole percent, of about 18–35% $P_2O_5$, 7–25% $B_2O_3$, 3–14% $Ta_2O_5$, and 33–67% $R_2O$, wherein $R_2O$ consists of alkali metal oxides selected from the group consisting of $Li_2O$, $Na_2O$ and $K_2O$. We have discovered that glasses can be formulated within this range which provide refractive index values exceeding that, for example, of conventional ophthalmic crown glass ($n_d$ about 1.523) while at the same time exhibiting glass transition temperatures below 500° C. In addition, with appropriate selections of $R_2O$ constituents, glasses with good resistance to moisture attack can be made. This combination of properties renders these glasses particularly suited for applications such as molded optics or the like.

BRIEF DESCRIPTION OF THE DRAWING

The invention may be further understood by reference to the drawing, which is a molar composition diagram showing a glass-forming region in a section of the $R_2O$-$Ta_2O_5$-$B_2O_3$-$P_2O_5$ quaternary system.

DETAILED DESCRIPTION

Referring more specifically to the drawing, a molar composition region of relatively easy glass formation in the $R_2O$-$Ta_2O_5$-$B_2O_3$-$P_2O_5$ composition system is diagrammatically shown, the diagram representing a cross-section of the quaternary system at the 50 mole percent $R_2O$ (alkali metal oxide) level. At this level the corner compositions reduce to $RBO_2$, $RTaO_3$ and $RPO_3$ on a molar basis. The broken line in the diagram outlines the region in which glasses can readily be formed by casting into slabs, although more rapid quenching methods permit the formation of glasses outside this region.

The areas of best glass function using $Na_2O$ or $Li_2O$ exclusively as the alkali metal components of the glass are the labeled, solidly bounded areas. Glasses containing $K_2O$ as the only alkali can be formed in either of these areas. Glasses in the glass-forming region to the right of the solidly bounded areas, although readily formed, tend to be sticky even in the presence of atmospheric moisture, and are low in water durability.

Glasses to be provided in accordance with the present invention can be compounded with conventional glass batch constituents, introduced in proportions which will yeild the desired glass constituents $R_2O$ (alkali metal oxides), $B_2O_3$, $P_2O_5$ and $Ta_2O_5$ upon melting the batch to form a glass. Examples of suitable batch constituents are the metaphosphates or nitrates of sodium, lithium and potassium, anhydrous boric oxide, and tantalum pentoxide.

Glasses within the above-disclosed composition range can be melted in conventional melting units such as pots, tanks or crucibles, at melting temperatures typically not exceeding about 1000° C., and can be formed into glass articles by casting, drawing, blowing, rolling or other conventional glass working methods. Preferably the batches will be mixed, as by tumble-mixing, prior to melting to aid in obtaining a homogeneous melt.

Some specific examples of glasses which may be provided in accordance with the invention are set forth in Table 1 below. The compositions in Table 1 are reported in weight percent, with approximate mole percent equivalents of the compositions of Table I being reported in Table IA.

TABLE I

| (Weight Percent) | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $P_2O_5$ | 41 | 40 | 30 | 30 | 43 | 31 | 38 | 30 | 37 | 35 | 31 | 40 |
| $Ta_2O_5$ | 26 | 34 | 20 | 26 | 20 | 37 | 18 | 31 | 39 | 36 | 33 | 32 |
| $B_2O_3$ | 16 | 11 | 13 | 8 | 8 | 6 | 7 | 5 | 6 | 6 | 20 | 12 |
| $Li_2O$ | 17 | 15 | — | — | — | — | — | — | 8 | 7 | 16 | 16 |
| $K_2O$ | — | — | 37 | 36 | — | — | 37 | 34 | — | 16 | — | — |
| $Na_2O$ | — | — | — | — | 29 | 26 | — | — | 10 | — | — | — |

TABLE IA

| (Mole Percent) | | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $P_2O_5$ | 27 | 27 | 25 | 27 | 33 | 30 | 33 | 30 | 30 | 30 | 19 | 24 |
| $Ta_2O_5$ | 5 | 7 | 5 | 7 | 5 | 10 | 5 | 10 | 10 | 10 | 6 | 6 |
| $B_2O_3$ | 20 | 16 | 20 | 16 | 12 | 10 | 12 | 10 | 10 | 10 | 25 | 20 |
| $Li_2O$ | 50 | 50 | — | — | — | — | — | — | 30 | 30 | 50 | 50 |

TABLE IA-continued (Mole Percent)

|     | 1 | 2 | 3 | 4 | 5 | 6 | 7 | 8 | 9 | 10 | 11 | 12 |
|-----|---|---|---|---|---|---|---|---|---|----|----|----|
| $K_2O$ | — | 50 | 50 | — | — | 50 | 50 | — | 20 | — | — | — |
| $Na_2O$ | — | — | — | 50 | 50 | — | — | 20 | — | — | — | — |

Glasses having compositions approximating those reported in Table I above were compounded utilizing the glass batch ingredients described above, tumble-mixed, and melted in covered silica crucibles at 1000° C. without stirring. The batches of course included trace amounts of elements such as iron, aluminum, silicon and the like as impurities but these are not reported since they are not deemed to affect the properties of the resultant glass. The melts were then cast into glass patties and placed in an annealer operating at 350°-400° C. for annealing and cooling.

Samples of glass were cut from the patties thus provided and tested for glass properties on a selected basis. Tests were made for refractive index ($n_d$) transition temperature and, in most cases, durability. The durability tests involved a 24-hour exposure of a glass sample to water at 40° C., with the resulting loss in weight, if any, being reported in milligrams per square centimeter of sample surface area. In many cases the appearance or surface condition of the sample after exposure to the durability test was noted.

TABLE II

|  | 1 | 2 | 3 | 4 | 5 | 6 | 7 | 8 | 9 | 10 | 11 | 12 |
|---|---|---|---|---|---|---|---|---|---|----|----|----|
| Tg (°C.) | 430 | 445 | 407 | 425 | 430 | 455 | — | 455 | 405 | — | 490 | 405 |
| $n_d$ | 1.594 | 1.62 | 1.526 | 1.548 | 1.538 | 1.586 | 1.526 | 1.564 | 1.624 | 1.598 | 1.616 | 1.610 |
| Weight Loss ($mg/cm^2$) [$H_2O$/40° C./24 hrs] | 18.0 | 1.0 | — | — | 65.0 | 1.6 | — | — | 0.03 | 0.06 |  |  |
| Appearance | Lightly frosted | No attack | — | — | Lightly frosted | No attack |  |  | No attack | No attack |  |  |

Composition studies such as reported in Tables I and II have provided information concerning the effects of some composition variations on glass properties in the $R_2O$-$Ta_2O_5$-$B_2O_3$-$P_2O_5$ composition system. In general, devitrification problems can be expected if excess quantities of any of $B_2O_3$, $P_2O_5$ and/or $Ta_2O_5$ are introduced, with incomplete melting being encountered where large excess amounts are tried.

Sticky glasses exhibiting poor durability or solubility in water can be formed if insufficient $Ta_2O_5$ is used. Glasses containing $K_2O$ as the only alkali metal oxide also exhibit poor durability, even in the presence of the specified amount of $Ta_2O_5$; this behavior is illustrated by composition Examples 7 and 8 of Table I, which exhibit very high solubility in water under the conditions of the durability test. On the other hand, glasses containing $K_2O$ in combination with, for example, $Li_2O$ can exhibit very satisfactory durability.

In general glasses wherein the $R_2O$ content is about 50-60 mole percent, with $K_2O$ constituting not more than about 20 mole prcent of the glass composition, exhibit the best combination of durability, softness and refractive power. Particularly preferred are glasses within this range wherein the $Li_2O$ content is at least about 30 mole percent, the $Ta_2O_5$ content is at least about 5 mole percent and the $B_2O_3$ content does not exceed about 17.5 mole percent. Within this range glasses exhibiting refractive index values of at least about 1.59, transition temperatures not exceeding about 450° C., and durability resulting in a weight loss on exposure to water at 40° C. not exceeding about 1.0 $mg/cm^2$ in a 24-hour exposure interval can readily be provided.

We claim:

1. A glass article having a composition consisting essentially, in mole percent, of about 18-35% $P_2O_5$, 7-25% $B_2O_3$, 3-14% $Ta_2O_5$, and 33-67% $R_2O$, wherein $R_2O$ consists of one or more alkali metal oxides selected from the group consisting of $Li_2O$, $Na_2O$ and $K_2O$, the glass forming the article exhibiting a glass transition temperature below 500° C. and a refractive index value ($n_d$) exceeding about 1.523.

2. A glass article in accordance with claim 1 wherein the $R_2O$ content is in the range of 50-60 mole percent, and wherein the $K_2O$ content does not exceed about 20 mole percent.

3. A glass article in accordance with claim 2 wherein the $Li_2O$ content is at least about 30 mole percent, the $Ta_2O_5$ content is at least about 5 mole percent, and the $B_2O_3$ content does not exceed about 17.5 mole percent, the glass forming the article exhibiting a glass transition not exceeding about 450° C., a refractive index value of at least about 1.59, and a durability such that the glass exhibits a weight loss on exposure to water at 40° C. not exceeding about 1.0 $mg/cm^2$ in a 24-hour exposure interval.

* * * * *